United States Patent [19]

5053372x et al.

[11] 3,725,782

[45] Apr. 3, 1973

[54] POTENTIOMETRIC MEASURING DEVICE WITH MULTIPLE STAGE COUNTER MECHANISM

[75] Inventors: Joel A. Naive, La Jolla; Peter J. Van Benschoten, Rancho Santa Fe, both of Calif.

[73] Assignee: Wavetek, San Diego, Calif.

[22] Filed: July 9, 1970

[21] Appl. No.: 53,372

Related U.S. Application Data

[62] Division of Ser. No. 561,558, June 29, 1966.

[52] U.S. Cl. .................. 324/98, 323/74, 338/129
[51] Int. Cl. ........................................... G01r 17/02
[58] Field of Search ....... 324/98, 99 R, 99 D; 200/18, 200/24; 323/79, 74, 94 R; 74/436; 235/133, 139; 338/122–134

[56] References Cited

UNITED STATES PATENTS

2,614,181  10/1952  Consalvi et al. ........................ 200/18

*Primary Examiner*—Rudolph V. Rolinec
*Assistant Examiner*—Ernest F. Karlsen
*Attorney*—Smyth, Roston & Pavitt

[57] ABSTRACT

In a potentiometric measuring counter assembly comprising rotary counters corresponding to successive orders of integers, the transfer means from each lower order counter to the next higher order counter is unidirectional to transmit a carry from the lower order counter to the higher order counter but to prevent the higher order counter from operating the lower order counter.

9 Claims, 26 Drawing Figures

INVENTORS
JOEL A. NAIVE
PETER J. Van BENSCHOTEN

ATTORNEYS

POTENTIOMETRIC MEASURING DEVICE WITH MULTIPLE STAGE COUNTER MECHANISM

CROSS-REFERENCES TO RELATED APPLICATIONS

This is a division of application Ser. No. 561,558, filed June 29, 1966.

This invention relates to a device to control a condition that is subject to adjustement by increments, which device comprises a bank of components adapted to vary the condition by increments of different magnitudes.

While the invention is widely adaptable for its basic purpose it has special utility as an instrument to control and/or measure an electrical value such as voltage, impedance, or frequency by means of a bank of components wherein the components provide increments of the value of different magnitudes to produce a closely controlled total value. Commonly, such an instrument is based on the decimal system and comprises a sequence of decade components each of which represents an order of ten integers. For example, a widely used type of manually operated digital voltmeter comprises an array of four rotary components which, respectively control increments of 0.1, 0.01, 0.001 and 0.0001 volts from zero to 0.9999, the three higher order components employing rotary switches and the lowest order component incorporating either a rotary switch or a continuously variable electrical circuit element.

The important problem to which the invention is directed is to provide random access to any value in this wide range with rapid transverse over the whole range through transfer points where counts are carried over from one component to one or more higher order components. Such a capability for time saving operation is of economical importance because of the high hourly rate of specialized personnel and is mandatory if the instrument is to be employed to measure a value which may appear suddenly and briefly or to measure a value which drifts and varies widely.

An electronically controlled automatic digital voltmeter meets the requirement for rapid operation but such a voltmeter is not only an expensive instrument but is also highly complicated. The long standing pressing need is for a much less expensive and less complicated instrument capable of the same kind of random access and rapid traverse.

In one type of manual instrument heretofore available, a rapid jump or traverse between the two widely spaced values in the overall range is facilitated by employing a sequence of decade components which are individually manually operable but are mechanically independent of each other. The operator may make an extreme jump from a value of 0.1000 to a value of 0.9000 by simply manipulating the most significant decade component. The difficulty, however, is that a small shift through a transfer point may be a cumbersome and time-consuming operation. For example, a shift of an increment of 0.0001 through a multiple stage transfer point from 0.4999 to 0.5000 requires individual manipulation of all four components. Obviously the data produced by such an instrument will have a time gap at the transfer point and may omit entirely a significant change occurring during the hiatus.

A second type of manual instrument heretofore available solves the problem of rapid traverse through a multiple stage transfer point by interlocking the decade stages for automatic carry over from each lower order stage to a higher order stage. Such an instrument may incorporate a decade counting mechanism with a Geneva wheel to transfer a carry from one stage to a higher order stage. Since the stages are mechanically interlocked by the Geneva wheels, manual operation is necessarily restricted to the lowest order component. Only a slight turn of the lowest order component is necessary to shift through the multiple stage transfer point from 0.4999 to 0.5000. Unfortunately, however, a shift between widely separated values is slowed down to the rate of manual operation of the lowest order component. For example, with the instrument reading 0.5000 a traverse to 0.6000 would require cranking the lowest order component through one hundred revolutions in a tedious and time-consuming manner.

An operator of the first type of manual instrument in following a changing value may make a rapid traverse between widely separated values but be defeated by a short traverse through a multiple stage transfer point and the operator of the second type of manual instrument may quickly follow a changing value through a multiple stage transfer point but be defeated by a sudden substantial increase or decrease in the changing value. The present invention combines the respective advantages of these two types of manual instruments with elimination of the disadvantages of both types.

Broadly described, the invention provides for interlocking individually manually operable decade components for automatic transfer of carry from one stage to a higher stage but employs a transmission means between stages that is unidirectional in that it locks a lower order stage against operation by the next higher order stage but freely transmits a carry from the lower order stage to the higher stage. Thus a selected component in the sequence may be individually operated with consequent operation of all higher stage components without affecting any lower stage component.

The unidirectional transmission means for transferring a carry from one stage to a higher order stage comprises a Geneva type driver gear fixedly connected to the lower order stage, a driven gear carried by the higher order stage, and an intervening idler gear operatively connecting the Geneva drive gear with the driven gear, the idler gear normally functioning to lock the lower order Geneva drive gear against rotation by the higher order drive gear. Within the scope of the invention any suitable arrangement may be employed to make such a transfer mechanism unidirectional, i.e. to permit one stage along with higher stages to be manually operated independently of a locked lower stage.

One arrangement that may be employed incorporates detent means between the Geneva drive gear of the lower stage and the driven gear of the higher stage. For example, the idler gear may be spring-biased for disengagement either from the Geneva drive gear of the lower stage or from the driven gear of the higher stage in response to rise of the applied torque to a predetermined magnitude. Another practical arrangement incorporates detent means between the driven gear and the higher order stage on which it is mounted so that with the driven gear immobilized by the locked lower order stage, the higher order stage may be rotated independently of its driven gear. Both of these arrangements require the application of overriding force to the higher order stage, but a third arrangement that may be employed avoids this necessity by providing a clutch to disconnect a higher order stage of a pair of successive stages from the locked lower order stage of the pair, which clutch may be operated automatically if desired.

The invention further teaches that such an instrument may be constructed either as an in-line mechanism or as a coaxial mechanism. The in-line instrument has the rotary stages positioned side-by-side with corresponding manual knobs and corresponding number disks on the front side of the instrument. The coaxial instrument employs coaxial shafts with coaxial manual means and coaxial number disks on the front end of the instrument. In this regard a feature of the preferred practice of the invention is the provision of gear and detent components that may be used interchangeably in the fabrication of in-line and coaxial instruments. A further feature is the concept of combining the two types in a single instrument for special purposes.

The features and advantages of the invention may be further understood by reference to the following detailed description and the accompanying drawings.

In the drawings, which are to be regarded as merely illustrative:

FIG. 21 is a diagrammatic perspective view of a weighing apparatus incorporating the principles of the invention;

Figures 1, 2, 6:
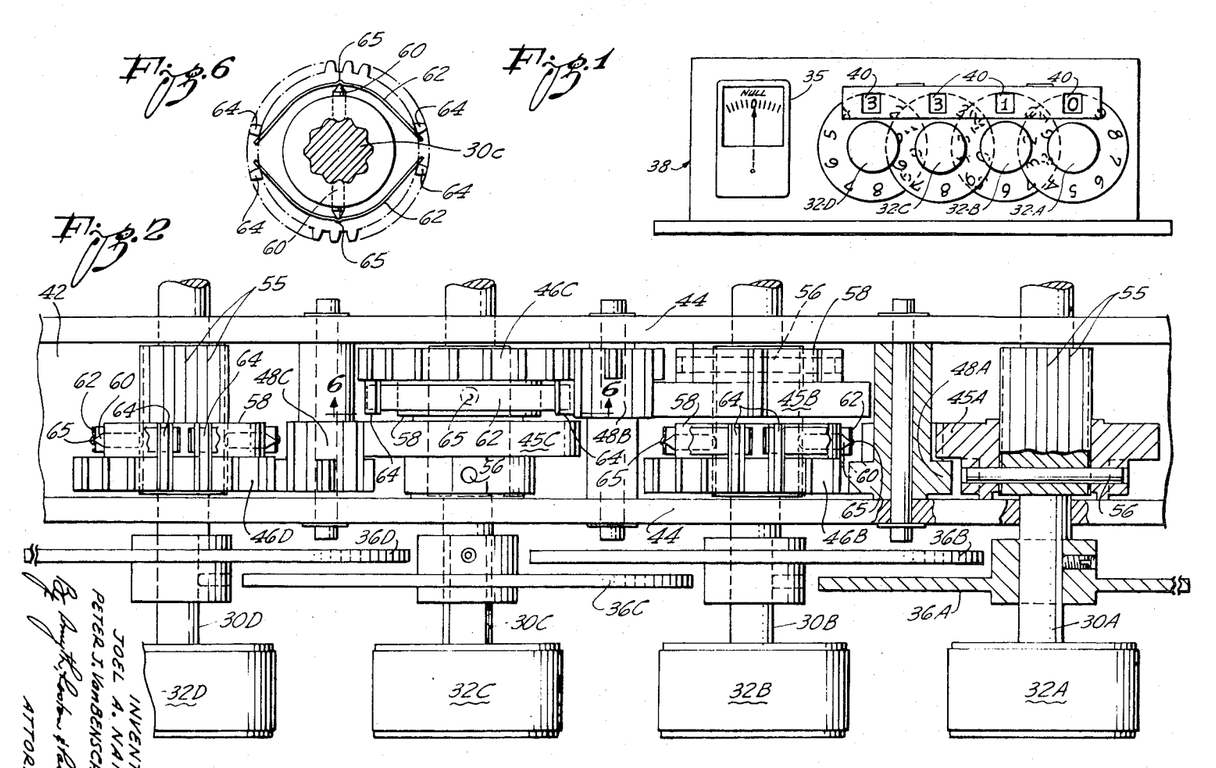
FIG. 1 is a front elevation of a selected embodiment of the invention in a form of a manually operable voltmeter.
FIG. 2 is a plan view partly in section of a four-stage counter that is employed in this embodiment.
FIG. 6 is a fragmentary section along the line 6—6 of FIG. 2, showing how a detent pin is biased by a leaf spring.

FIGS. 1 to 8 show, by way of example, the structure that may be employed for a manually operable voltmeter incorporating the principles of the invention, the voltmeter having a range of 0.0001 to 0.9999 volts. Broadly described, this first embodiment of the invention comprises a counter assembly (FIG. 2) having four counters represented by four shafts 30A – 30D. The four counters 30A – 30D are equipped with corresponding manual knobs 32A – 32D for actuating corresponding electrical components (FIG. 3) 34A – 34D with the guidance of a null indicator 35 (FIG. 1). The four counters 30A – 30D carry corresponding numbered disks 36A – 36D and are shown in FIG. 1. The device may be mounted in a suitable housing 38 having four windows 40 for viewing the integers on the four disks.

The multiple stage counter may be based on any desired radix or system of measurement. In this instance the counter is based on the radix ten, each counter disk 36 having 10 stations bearing numerals 0 – 9 respectively.

The counter assembly may be mounted on a channel-shaped frame member having a bottom web 42 and two upright parallel flanges 44 in which the four shafts or counters 30A – 30D are journalled.

The first three counters, 30A, 30B and 30C fixedly carry corresponding Geneva type drive gears 45A, 45B and 45C. The three counters 30B, 30C and 30D carry corresponding driven gears 46B, 46C and 46D. It may be noted that for economy in the utilization of space the drive gears and the driven gears alternate in position. Thus the driven gear 46B is forward of the drive gear 45B on the counter 30B and the driven gear 46C is rearward of the drive gear 45C on the counter 30C.

Between the two counters of each pair of successive counters a suitable idler gear 48 operatively connects the drive gear of the lower counter of the pair to the driven gear of the higher counter of the pair. Thus an idler gear 48A permits the drive gear 45A of the first or lowest order counter 30A to actuate the driven gear 46B of the second counter 30B; and idler gear 48B permits the drive gear 45B of the second counter to actuate the driven gear 46C of the third counter 30C; and a third idler gear 48C permits the drive gear 45C of the third counter to actuate the driven gear 46D of the fourth counter 30D.

Figures 3, 4, 5:
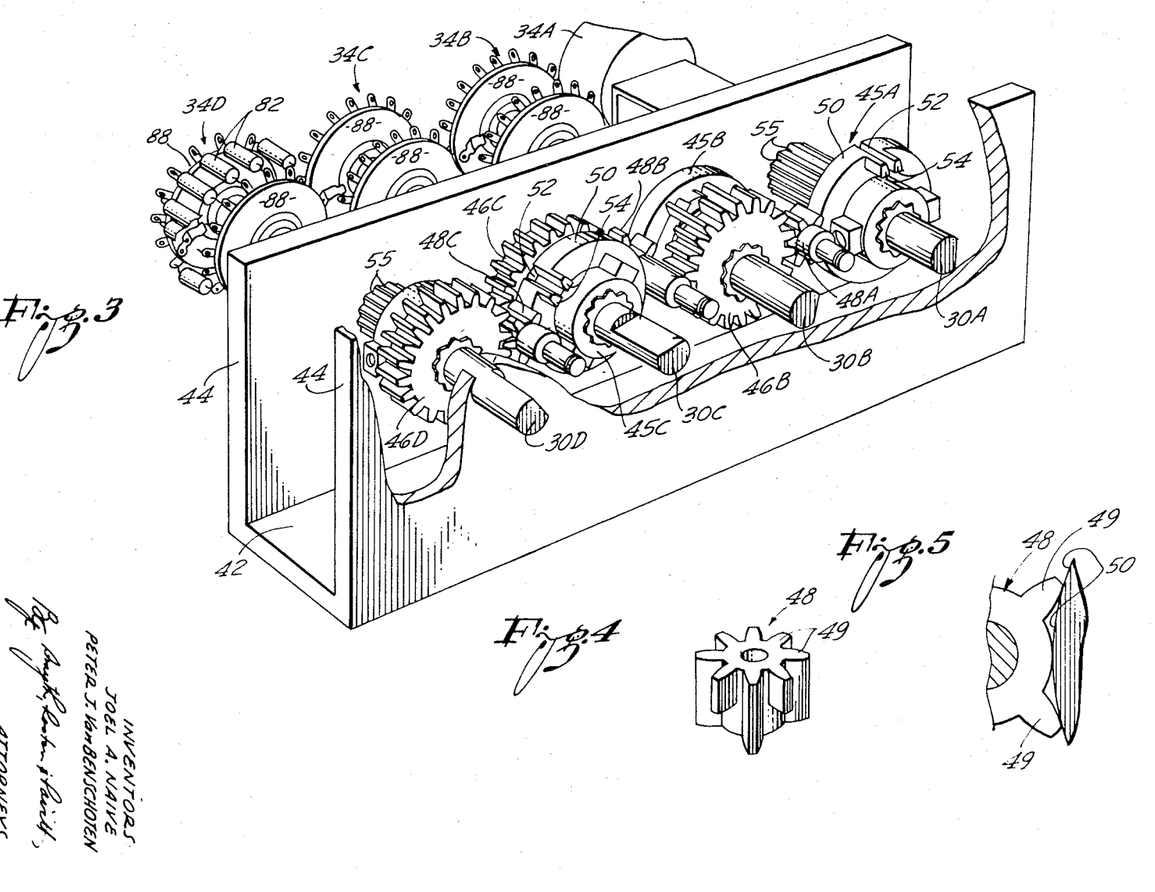
FIG. 3 is a perspective view of the counter assembly with parts broken away.
FIG. 4 is a perspective view of an idler gear that is employed in the counter assembly.
FIG. 5 is a fragmentary diagrammatic sectional view showing how the idler is normally related with an associated Geneva type drive gear.

As best shown in FIG. 4 each of the idler gears has eight teeth 49 to actuate the corresponding driven gear and four of the eight teeth are extended in length to cooperate with the corresponding Geneva type drive gear. As best shown in FIG. 3 each of the Geneva type drive gears 45A – 45C has a cylindrical peripheral portion 50 with a single transverse groove 52 to cooperate with the four extended teeth of the associated idler gear 48 and each of the Geneva type drive gears is further formed with a pair of teeth 54 which extend the peripheral groove 52 and which cooperate with the eight teeth of the associated idler gear.

In a well known manner normally two of the tooth of an idler gear abut the peripheral portion 50 of the associated, as shown in FIG. 5, to lock the idler gear against rotation and thereby lock the associated driven gear 46 against rotation. Once in each revolution of a drive gear, the transverse groove 52 and the two teeth 54 of the drive gear engage the corresponding idler gear 48 to rotate the idler gear by two teeth and thus rotate the associated driven gear 46 by two teeth. Since each driven gear 46 has twenty teeth each rotation of the corresponding drive gear advances the driven gear by one-tenth of a revolution.

It is apparent that each set of gears comprising a drive gear 45, an idler gear 48 and a driven gear 46 serves as transfer means between the two counters of each pair of successive counters to transfer to the higher order counter of the pair a carry generated by the lower order counter. As heretofore pointed out, an important feature of the invention is that each of these transfer means is unidirectional to permit a carry to be transferred from the lower order counter of the pair to the higher order counter while preventing the higher order counter of the pair from operating the lower order counter. In other words each transfer means is releasable to permit manual rotation of the higher order counter independently of the lower order counter of each pair of successive counters.

In the first embodiment of the invention the unidirectional concept is carried out by providing detent means between the two counters of each pair of successive counters. As shown in FIG. 2 each counter or shaft 30 has an enlarged portion the periphery of which is formed with a circumferential series of 10 equally spaced longitudinal V-shaped grooves 55. Each of the drive gears 45 is fixedly mounted on the enlarged portion of the corresponding counter by a diametrical pin 56 but each of the driven gears 46 is mounted on the corresponding counter 30 in a freely rotatable manner.

Each driven gear 46 has a relatively large hub portion 58 having two diametrically opposite radial bores in which two corresponding detent pins 60 are slidingly mounted and are spring biased into yielding engagement with the longitudinal grooves 55. In this particular embodiment of the invention each of the detent pins 60 is under the pressure of a corresponding leaf spring 62 that is flexed against the detent pin by a pair of lugs 64 on the driven gear. As indicated in FIG. 6 the two lugs 64 may be in the form of lateral extensions of two of the teeth of the driven gear. Each leaf spring 62 may be formed with a central dimple 65 (FIGS. 2 and 6) to seat the outer end of the corresponding detent pin, the dimple keeping the leaf spring centered relative to the detent pin.

By virtue of the yielding engagement of the detent pins 60 with the longitudinal grooves 55 of the corresponding counters 30, each driven gear 46 and the corresponding counter 30 normally rotate in unison, the driven gear rotating the counter whenever a carry is transferred to the driven gear from a lower order counter. If, however, any substantial torque is developed between a driven gear 46 and the counter 30 on which it is mounted, the detent pins 60 of the driven gear yield to permit relative rotation between the driven gear and the counter. If, for example, the driven gear 46B on the counter 30B is immobilized because the corresponding idler gear 48A is immobilized by the drive gear 45A, manual torque applied to the knob 32B will rotate the counter 30B with slippage between the counter and the driven gear 46B. Thus, overriding rotary force applied manually to the knob 32B causes operation of the counter 30B with possible carry to the higher counters 30C and 30D but without any effect on the lowest order counter 30A.

Figure 13:
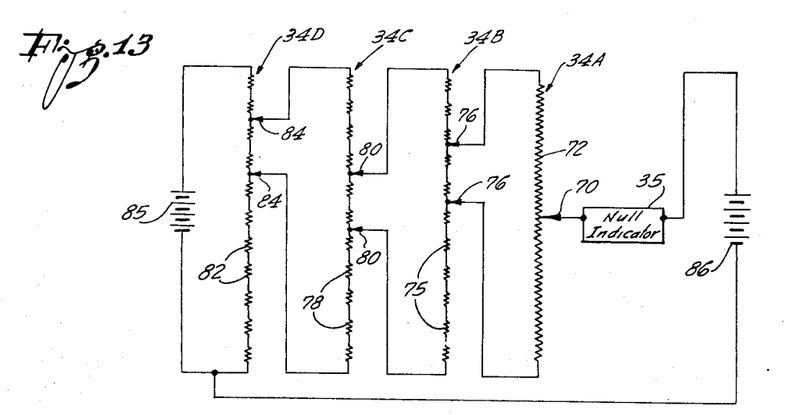
FIG. 13 is a wiring diagram of the circuit employed in the manually operable voltmeter.

For the purposes of a voltmeter, the four electrical components 34A – 34D which are controlled by the four counters 30A – 30D respectively may be subdivisions of a circuit means shown diagrammatically in FIG. 13. In FIG. 13 the electrical component 34A operated by the lowest order counter 30A comprises a rotary potentiometer in which a contact 70 operated by the counter 30A traverses an 80 ohm resistor 72.

Component 34B comprises a series of eleven resistors 75 of 40 ohms each and a pair of spaced contacts 76 operated by the counter 30B. The two contacts 76 which move in unison straddle two of the eleven resistors 75 and are connected respectively to opposite ends of the resistor 72 of the first counter. Component 34C has a series of 11, 200 ohm resistors 78 traversed by a pair of spaced contacts 80 that rotate with counter 30C and are connected to the opposite ends of the series of eleven resistors 75. In like manner component 34D has 11, 1,000 ohm resistors 82 in series traversed by a pair of spaced contacts 84 that are operated by counter 30D, the two contacts being connected to the series of resistors 78.

The 11 resistors 82 are energized by a battery 85. One side of the previously mentioned null indicator 35 is connected to the contact 70 of the potentiometer 34A. A circuit 86 whose voltage is to be measured by the voltmeter is connected to the other side of the null indicator.

Figures 7, 8:
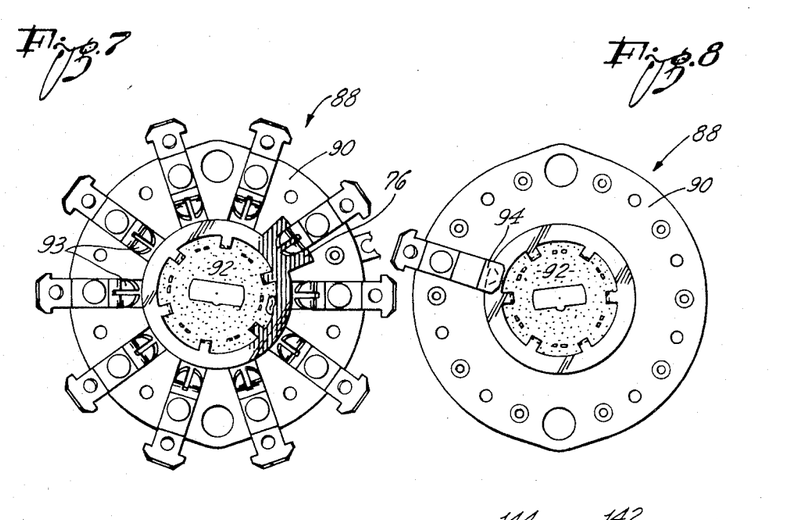
FIG. 7 is an elevational view showing one face of a rotary switch that may be employed.
FIG. 8 is an elevational view showing the second face of the rotary switch.

As indicated in FIG. 3, each of the electrical components 34B, 34C and 34D may comprise two rotary switches 88 with the corresponding series of eleven resistors connected between the two switches. FIGS. 7 and 8 show the structure of a rotary switch 88, for example, the rotary switch which is associated with one of the two contacts 76 of the counter 34B.

The rotary switch 88 has a stator 90 fixedly mounted on the frame of the counter assembly and has a central rotor 92 that is keyed to the counter 34B for rotation therewith. The stator 90 has ten fixed contacts 93 that are connected to the resistor 75 and the contact 76 extends radially from the rotor 92 to cooperate with the ten contacts in sequence. A fixed contact 94 in wiping contact with rotor 92 is connected to one end of the resistor 72 of the potentiometer 34A.

In FIG. 13, it is apparent that the two contacts 84 place two of the 1,000 ohm resistors 82 in parallel with a total resistance of 2,000 ohms, the combination having a resultant resistance of 1,000 ohms. With the battery 85 generating a constant 1 volt, each step by which the two contacts 84 are moved by one-tenth rotation of the counter 30D varies the voltage through the null indicator by 0.1000 volt. In like manner one-tenth rotation of the other three counters 30C, 30B and 30A vary the overall voltage by increments of 0.0100 volt, 0.0010 volt and 0.0001 volt respectively. Thus in FIG. 1 the numerals in the windows 40 indicate an overall voltage value of 0.3310.

It is apparent that by virtue of the described unidirectional transfer means between successive counters, a higher order counter may be manually operated independently of lower order counters. For example a quick shift of as much as 0.9000 volts may be made by simply rotating the knob 32D. On the other hand, one-tenth of a turn of the lowest order knob 32A can carry out a multiple stage transfer from the voltage value of 0.4999 to the voltage value of 0.5000.

An important advantage of the invention is that combining a null indicator with the multiple stage mechanism makes it possible for the operator to follow various procedures for quickly matching an unknown voltage of an outside circuit without the operator taking the trouble to make interim readings of the numbers on the disk 36A – 36D. For example, assuming that an unknown voltage is 0.5001 and the adjustment of the instrument at the start is for the value 0.3579, a logical and time-saving trial and error procedure may be followed that is set forth in the following sequential tabulation wherein the underlined digit in each number corresponds to the number disk reading of the knob that is being rotated and an asterisk indicates where a null point is passed and therefore manual rotation is to be shifted from one knob to the next knob in sequence:

| Dial Reading | Resulting Null Indication |
| --- | --- |
| 3579 | low |
| 4579 | low |
| 5579 | high* |
| 5479 | high |
| 5379 | high |
| 5279 | high |
| 5179 | high |
| 5079 | high |
| 4979 | low* |
| 4989 | low |
| 4999 | low |
| 5009 | high* |
| 5008 | high |
| 5007 | high |
| 5006 | high |
| 5005 | high |
| 5004 | high |
| 5003 | high |
| 5002 | high |
| 5001 | -null- |

Another advantage of an embodiment of the invention that incorporates a detent means in each transfer means is that during a random access manipulation, i.e. during rotation of any knob above the lowest order, the detent action gives the operator a definite sensing of the number of digits that are added or subtracted by the rotation. In addition the detent means serves to center the rotary contact of each rotary switch at one of the associated ten fixed contacts. A further advantage of the invention is the possibility of manually adjusting one stage independently of the next higher order stage as well as independently of the next lower order stage. To manipulate any given stage in this completely independent manner, it is necessary merely to grasp and immobilize the knob of the next higher order stage while the given stage is manipulated.

Figures 9, 10, 11:
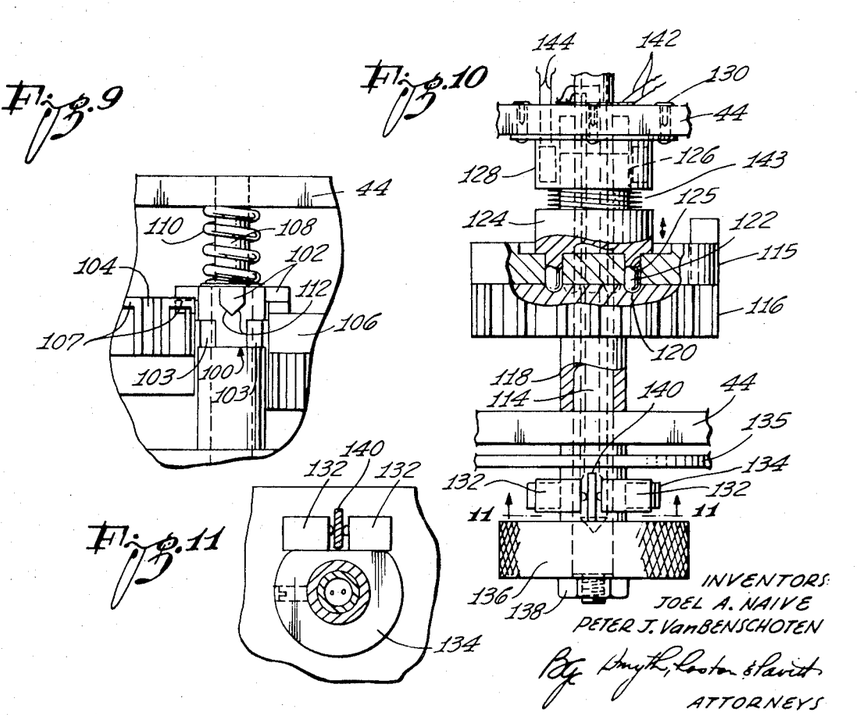
FIG. 9 is a fragmentary plan view showing how an idler gear may be spring loaded to function as a detent means.
FIG. 10 is a fragmentary view partly in plan and partly in section showing a counter stage equipped with a clutch that is operable by very low torque applied manually to the counter.
FIG. 11 is a sectional view along the line 11—11 of FIG. 10 showing how a pair of microswitches is associated with the knob for operating the clutch.

FIG. 9 indicates how another form of detent means may be incorporated in a transfer mechanism between two stages of the counter mechanism. In FIG. 9 an idler gear 100 has one set of four short teeth 102 and a second set of four teeth 103, the two sets serving to engage a driven gear 104 and a Geneva type drive gear 106. The idler gear 100 is rotatably and slidably mounted on a shaft 108 and is normally held in its operative position by a coil spring 110 that encircles the shaft. Each of the four teeth 102 is tapered to provide two opposite cam surfaces 112. The drive gear 106 is, of course, fixedly mounted on the corresponding counter and the driven gear 104 is likewise fixedly mounted on its counter. To provide a 10-position detent action, the twenty teeth of the drive gear 104 are paired by webs or bridges 107 that interconnect ends of the teeth of each pair. Thus the tapered teeth 102 of the idler gear 100 "see" ten large teeth instead of twenty small teeth. When the drive gear 106 of the lower order counter rotates into operating engagement with the idler gear 100 to transfer a carry to the higher order counter, the idler gear transmits the rotation to the driven gear 104 in the normal manner. If the higher order counter is individually manipulated, however, while the idler gear 100 is locked by the peripheral surface 50 of the drive gear 106 as shown in FIG. 5, the bridged teeth of the driven gear 104 act on the cam surfaces 112 of the four teeth 102 to cause the idler gear to retract out of engagement with the driven gear in opposition to the force exerted by the spring 110.

Figure 12:
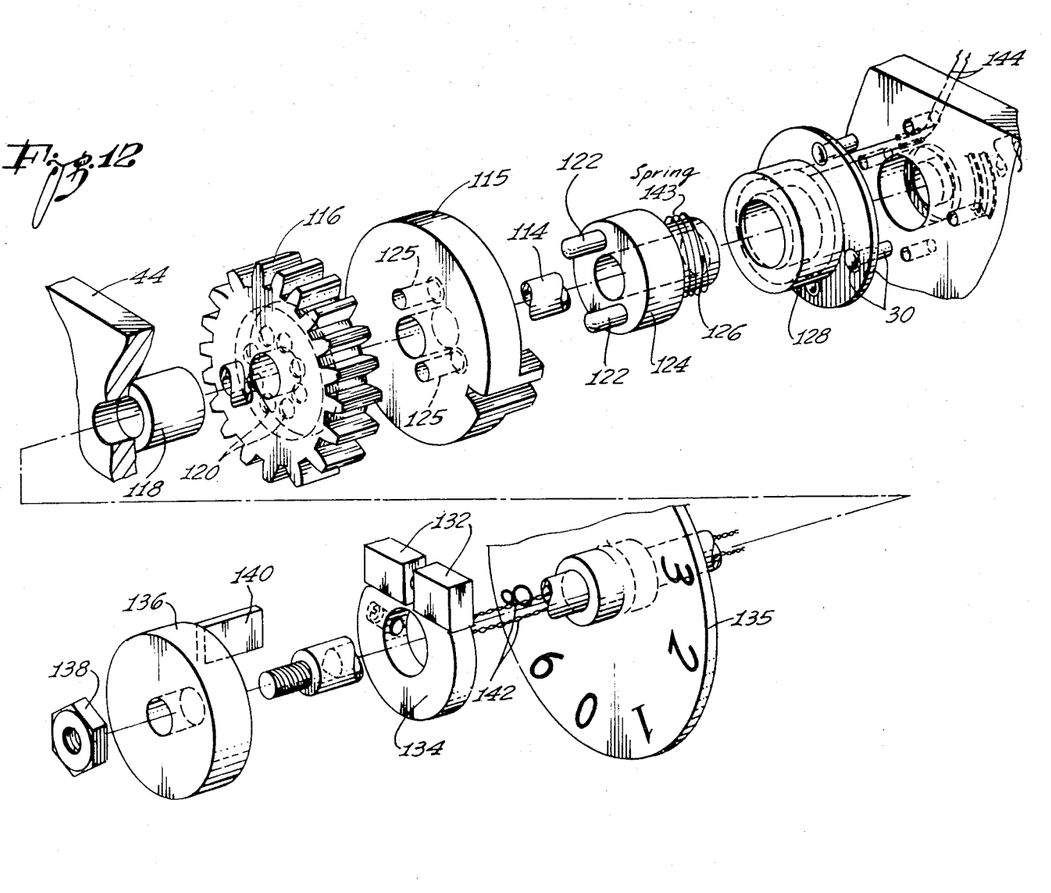
FIG. 12 is an exploded view of the counter stage shown in FIG. 10.

FIGS. 10, 11 and 12 show how clutch means instead of detent means may be incorporated in each transfer mechanism to permit a counter to be manipulated without affecting lower order counters. A shaft 114 which functions as a counter is journalled in the two upright flanges 44 of a counter assembly frame and fixedly carries a Geneva type drive gear 115. The usual 20-tooth driven gear 116 is rotatably mounted on the shaft 114 and is held in abutment with the drive gear 115 by a spacer sleeve 118. The face of the driven gear 116 that abuts the drive gear 115 is formed with ten equally spaced recesses 120 to cooperate with the two longitudinal pins 122 of a clutch collar 124 that is slidingly mounted on the shaft 114. The two longitudinal pins 122 of the clutch pin slidingly extend through two corresponding bores 125 in the drive gear 115 and normally seat in a diametrical pair of the recesses 120. The clutch collar 124 is unitary with a tubular armature 126 of a cylindrical solenoid 128 that is mounted on a frame flange 44 by suitable fastening means 130.

The solenoid 128 is controlled by a pair of confronting microswitches 132 which are mounted on a collar 134 which is fixedly mounted on the shaft 114. The collar 134 is spaced forward from the usual number disk 135 which is also fixedly mounted on the shaft. A knob 136 for manipulation of the shaft 114 is rotatably mounted on the shaft and is retained by suitable means such as a nut 138. The knob 136 has a radial ear 140 which extends between the two microswitches 132 and thus limits the relative rotation of the knob. The control circuit for the solenoid 128 includes wires 142 which extend through an axial bore in the shaft 114 and are connected to slip rings (not shown) inside the solenoid. The solenoid in turn is connected to a suitable EMF source by wires 144.

Normally the shaft 114 of the counter is rotated by means of the driven gear 116, the driven gear being periodically advanced by one-tenth of a rotation for a carry transferred from the next lower order counter. If, however, the operator grasps the knob 136 and rotates the knob in either direction, the ear 140 of the knob transmits the torque by pressure against one of the microswitches 132 with the consequence that the clutch sleeve 124 is immediately retracted to free the drive gear 115 from the immobilized driven gear 116 and thus permit the knob to actuate the drive gear independently of the driven gear. The springs (not shown) in the two microswitches 132 are of adequate strength to overcome the inertia of the knob 136 to cause rotation of the knob in response to rotation of the shaft by a lower order idler gear without causing either microswitch to open. On the other hand, the springs of the microswitches are weak enough to respond to manipulation of the knob 136 with the required degree of sensitivity. Whenever the knob is released from manual manipulation the solenoid is deenergized to permit the spring 143 of the solenoid to return the clutch to its normal position, the spring acting on the tubular armature 126. The two pins 122 promptly seat in a pair of the recesses 120 to interlock the driven gear 116 with the drive gear 115.

Figure 14:
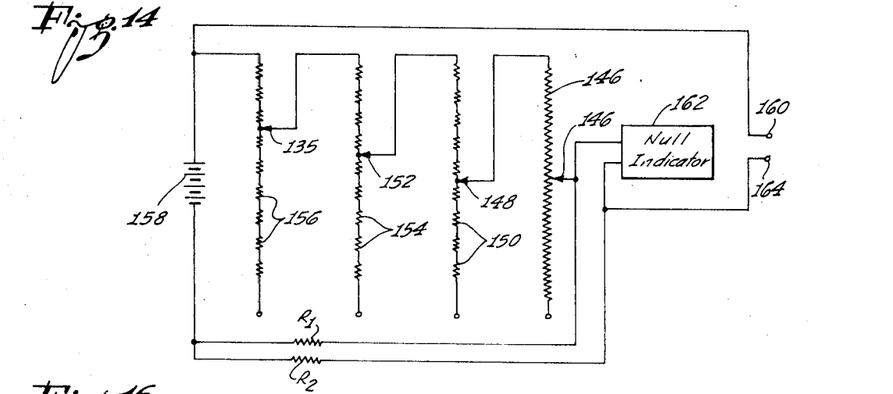
FIG. 14 is a wiring diagram of a circuit that may be employed for measuring impedance.

FIG. 14 is a diagram of circuit means that may be employed with a counter assembly of the character described for the purpose of measuring an unknown impedance. The lowest order counter controls a contact 145 that traverses a circular potentiometer resistor 146. The upper end of the resistor 146 is connected to a rotary contact 148 of the second order counter, the contact being movable along a series of nine resistors 150. The upper end of the series of resistors 150 is connected to a rotary contact 152 of the third order counter which traverses a series of nine resistors 154. Finally the upper end of the series of resistors 154 is connected to a rotary contact 155 of the highest order counter, which contact traverses a series of nine resistors 156.

The positive side of a battery 158 is connected to the upper end of the series of resistors 156 and is also connected to a terminal 160. The negative side of the battery 158 is connected to a pair of parallel resistors R1 and R2 which are of equal value. Resistor R1 is connected to the contact 145 and to a null indicator 162. The second resistor R2 is also connected to the null indicator and is further connected to a second terminal 164. The outside impedance that is to be measured is connected across the two terminals 160 and 164.

It may be seen that the resistors 156, 154, 150 and 145 and the outside impedance form two adjacent legs of a Wheatstone bridge whereby the null indicator may be employed to ascertain when the total impedance of the subdivisions of the circuit means equals the unknown outside impedance. In a typical embodiment of the invention the value of the potentiometer resistor 146 is 10 ohms; each of the nine resistors 150 is a 10 ohm resistor; the nine resistors 154 are 100 ohm resistors; and the nine resistors 156 are 1,000 ohm resistors. This permits direct measurement of impedance as high as 10,000 ohms.

Figure 15:
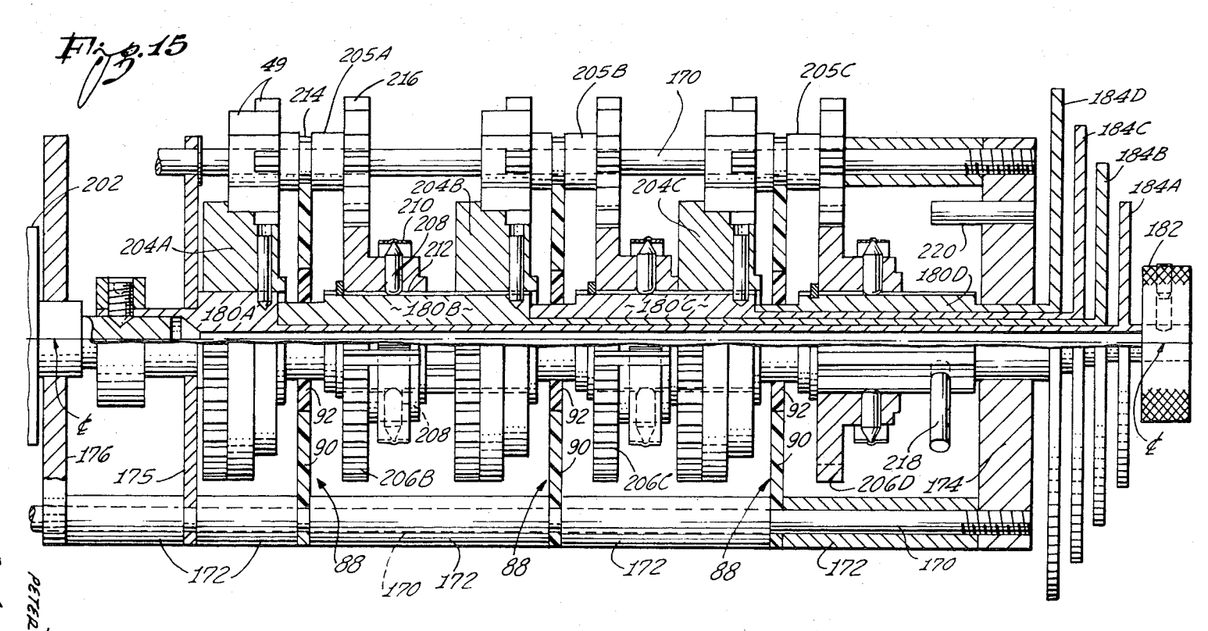
FIG. 15 is a plan view partly in section of a four-stage coaxial counter assembly.
Figure 16:
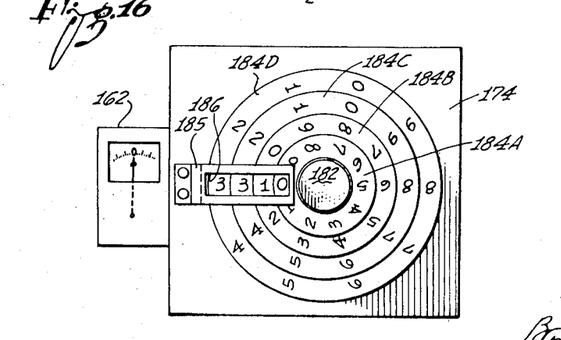
FIG. 16 is a front elevational view of the coaxial counter.

FIGS. 15 and 16 indicate the construction of a coaxially arranged mechanism for controlling the subdivisions of the circuit means shown in FIG. 14.

The coaxial instrument has a frame structure which comprises a series of spaced transverse plates interconnected by longitudinal rods 170 and spacer sleeves 172. The transverse plates comprise a front plate 174, two spaced rear plates 175 and 176 and three stators 90 of three previously described rotary switches 88. As shown in FIG. 16, the previously mentioned null indicator 162 may be mounted on the left edge of the front plate 174 and a bracket 185 may be mounted on the front plate to provide a rectangular window 186 for display of four digits. The four counters comprise four coaxial shafts 180A – 180D, the inner and lowest order counter 180A having a manually operable knob 182 which is unitary with a number disk 184A. The coaxial shafts 180B, 180C and 180D have corresponding number disks 184B, 184C and 184D which are knurled to serve as manual means for individual control of the different counters.

The innermost and lowest order counter 180A is connected to a potentiometer 202 on the rear end of the instrument which incorporates the movable contact 145 and resistor 146 of FIG. 14. The lowest order counter 180A is formed with an enlargement on which is mounted a Geneva type drive gear 204A of the character heretofore described and this drive gear is operatively connected by an idler gear 205A to a driven gear 206B on an enlargement of the second order counter 180B. In the usual manner, the driven gear 206B incorporates detent means in the form of a pair of pins 208 which are biased by corresponding leaf springs 210 into yielding engagement with the longitudinal grooves 212 in he second order counter 180B.

It is to be noted that the drive gear 204A and the driven gear 206B are separated by the stator 90 of a rotary switch 88. For clarity of illustration all of the rotary switches 88 in FIG. 15 are simplified with omission of the various contacts of the rotary switches as well as omission of the resistors associated with the rotary switches. The rotary switch between the drive are 204A and the driven gear 206B provides the rotary contact 148 of FIG. 14 that traverses the nine resistors 150.

The idler gear 205A is formed with a central circumferential groove 214 which seats in a notch of the adjacent stator 90 to restrain the idler gear against axial movement on a fixed shaft 115. The idler gear 205A has eight alternately short and long teeth 49 for cooperation with the drive gear 204A and has a separate of eight short teeth 216 to actuate the driven gear 206B.

The enlargement of the second order counter 180B fixedly carries a corresponding drive gear 204B which is connected by an idler gear 205B with a driven gear 206C which is mounted by the usual detent means on an enlargement of the third order counter 180C. The idler gear 205B straddles the stator 90 of a rotary switch 88 which provides the previously mentioned rotary contact 153 of FIG. 14 for traversing the nine resistors 154. Finally, a Geneva type drive gear 204C on he third order counter 180C is connected by an idler gear 205C with a driven gear 206D which is mounted by the usual detent means on an enlargement of the highest order counter 180D. The idler gear 205C straddles the stator 90 of a rotary switch 88 which provides the previously mentioned rotary contact 135 of FIG. 14 for traversing the nine resistors 156. The enlargement of the highest order counter 180D is provided with a radial pin 218 which cooperates with a fixed stop pin 220 to limit the rotation of the highest order counter to keep the counter from being rotated past the position corresponding to digit 9 on the number disk 184D.

It is apparent that the coaxial instrument shown in FIG. 15 incorporates the same principles as the in-line instrument shown in FIG. 2 and may be operated in the same manner with the same advantages. Being more compact in width dimension, the coaxial instrument may be used with special advantage in some installations where space is limited. It is contemplated that the gears of both the in-line instrument and the coaxial instrument will be made of plastic and will be of identical configurations for interchangeable use in the two types of instrument. It will be obvious to those skilled in the art that the coaxial instrument shown in FIG. 15 may incorporate the circuit means of FIG. 13 and, on the other hand, the in-line instrument of FIG. 2 may incorporate the circuit means of FIG. 14. It also may be appreciated that either of the two counter assemblies may be incorporated into an instrument that operates automatically instead of wholly manually.

Figure 17:
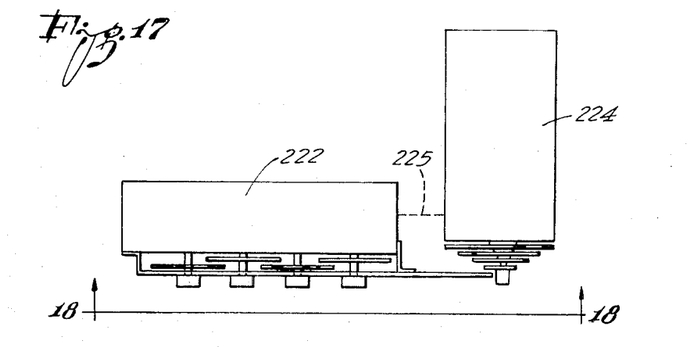
FIG. 17 is a diagrammatic plan view showing how a four-stage in-line counter assembly may be combining with a coaxial counter assembly to provide an eight-stage counter.
Figure 18:
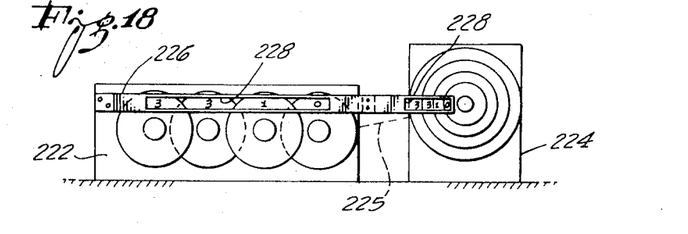
FIG. 18 is a front elevation of the eight-stage counter as seen along the line 18—18 of FIG. 17.

FIG. 17 indicates diagrammatically how a four-stage in-line instrument 222 may be employed in tandem with a coaxial instrument 224 to provide a composite instrument displaying values in terms of eight integers. For this purpose the lowest order counter of the in-line instrument 222 is connected to the highest order counter of the coaxial instrument 224 by previously described unidirectional transfer means that is indicated by the dotted line 225. FIG. 18 shows how a bracket 226 extending across the front of the two instruments may provide two windows 228 to display the eight digits.

Figure 19:
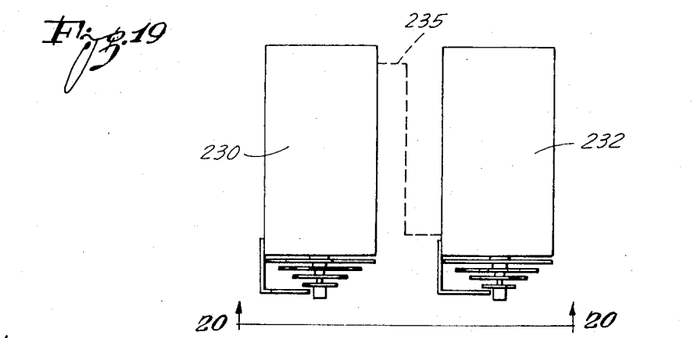
FIG. 19 is a diagrammatic plan view showing how two coaxial four-stage counter assemblies may be combined in tandem to provide an eight-stage counter.
Figure 20:
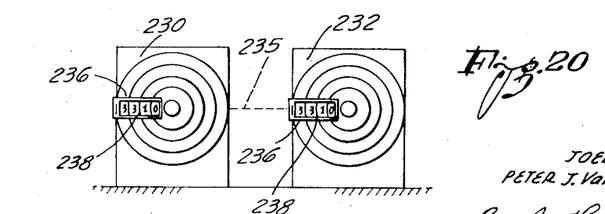
FIG. 20 is a front eleVation view of the counter in FIG. 19 as seen along the line 20—20.

FIGS. 19 and 20 show how two coaxial instruments 230 and 232 may be used in tandem to display values in terms of eight digits, the combination making a composite instrument that is especially compact in width dimension. As indicated by dotted line 235 the lowest order counter of the coaxial instrument 230 is connected by previously described unidirectional transfer mechanism with the highest order counter of the second coaxial instrument 232. As shown in FIG. 20, two brackets 236 mounted on the front ends of the two instruments respectively provide a pair of windows 238 to display the eight integers.

FIGS. 21–25 show the general construction of a weighing apparatus incorporating principles of the invention. The purpose of the apparatus is to use the type of counter mechanism heretofore described for the purpose of applying increments of weight to one pan of a balance to ascertain the weight of an object on the other pan of the balance. As shown in FIG. 21, the balance comprises an upright support structure 240 on which a rectangular beam 242 is free to rock, the beam having a pair of knife elements 244 resting in V-shaped seats 245. A first pan 246 is suspended from the beam 242 to receive an object 250 that is to be weighed. A second pan 252 receives increments of weight to make up a total weight for comparison with the unknown weight. The overhead beam 242 carried a null indicator in the form of a pointer 254 that traverses an arcuate scale 255.

The apparatus has a counter assembly in a casing 256 comprising a first or lowest order counter 260A, a second higher order counter 260B and a highest order counter 260C, the three counters being operated by manual knobs 262A – 262C respectively and being equipped with three number disks 264A – 264C respectively. The counter assembly may be based on any radix or system of measurement. In this particular embodiment of the invention, the device measures weights in terms of ounces to the second decimal place and therefore each of the number disks has ten numerals which may be observed through three windows 265 respectively. The three counters 260A – 260C are interconnected by previously described unidirectional transfer means (not shown) for transferring a carry from the lowest order counter to the second order counter and from the second order counter to the third order counter.

The lowest order counter 260A controls a corresponding cam 266A by means of s shaft 268A and the cam cooperates with a follower in the form of a roller 270A mounted on one face of a gear 272A. The gear 272A is on a rocker shaft 274A that carries an arm 275A fir depositing weights on the pan 252. A stack 276A of nine weights is suspended from the outer end of the arm 275A by a cable 278A and the outer end of the arm is formed with a concentric surface 280 in tangential contact with the cable so that the cable may be raised and lowered along a vertical line without deviation from the vertical line.

Figure 22:
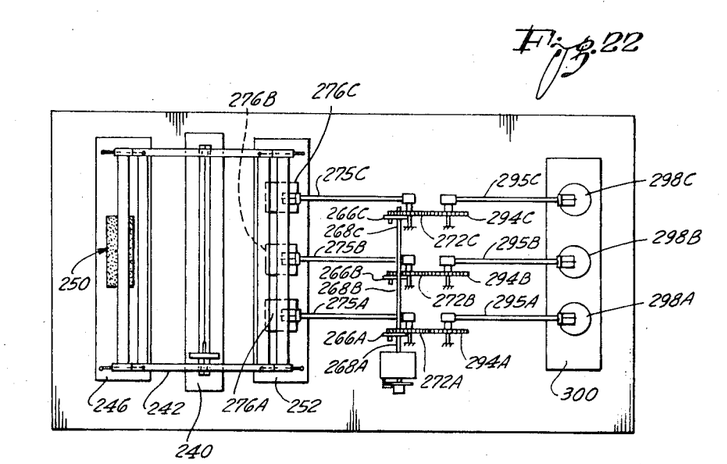
FIG. 22 is a diagrammatic plan view of structure shown in FIG. 21.
Figures 23, 24, 25:
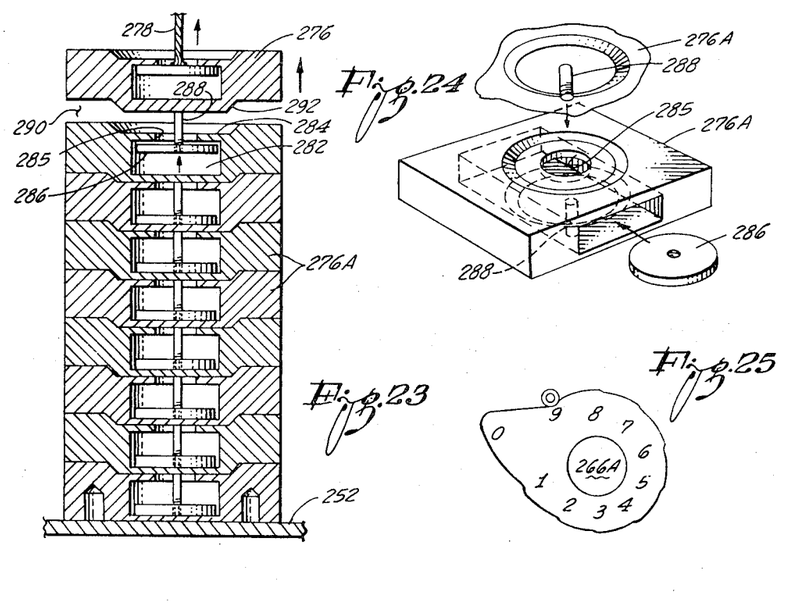
FIG. 23 is a longitudinal sectional view of a stack of interconnected weights that is used in the apparatus.
FIG. 24 is a diagrammatic perspective view showing how two of the weights of the stack are interconnected.
FIG. 25 is an elevational view of a cam that is used in the apparatus.

As shown in FIG. 23 each weight 276 of a stack of weights has a central cavity 282, the cavity having a top wall 284 with an aperture 285 therein. Captive in each of the cavities with freedom for vertical movement therein is a disk 286 that is larger than the aperture 285. The disk 286 of the topmost weight 276 is connected to the cable 278. Each disk 286 is each cavity of the other eight weights is connected by a pin 288 to the next weight above. Preferably the weights 276 are shaped to nest together as indicated in FIG. 22, each weight having a circular recess 290 on its upper side and all of the weights except the bottom weight having a corresponding circular boss on its underside.

FIG. 23 shows the cable 278 slightly elevated to lift the topmost weight 276 free from the stack to leave eight of the weights supported by the pan 252. It is apparent that the series of weights 276 may be raised free from the pan 252 or may be lowered by steps to cause any number of the weights to rest on the pan. It may be understood by referring to FIG. 25 that clockwise rotation of the cam 266A through one revolution from the zero position lowers the stack of nine weights by steps to deposit the nine weights on the pan 252 in sequence, the last tenth of the revolution lifting the stack clear from the pan.

A feature of the invention is the concept of counterbalancing the stack of weights 276A to reduce the pressure of the follower 270A on the cam 266A. For this purpose a counterbalance gear 294A in mesh with the gear 272A controls a counterweight arm 295A. The counterweight arm 295A carries a cable 296A to control a stack of nine counterweights 298A which are deposited on a fixed platform 300. Preferably the counterweights 298A weigh slightly less than the weights 276A for the purpose of biasing the roller 270A against the cam 266A. If the desired, however, the counterweights 298A may be equal to the weights 276A, suitable spring means being used to bias the roller 270A against the cam.

The second order counter 260B operates a shaft 268B to control a cam 266B that functions in the previously described manner to operate a gear 272B to swing an arm 275B for controlling a stack of weights 276B and to operate a gear 294B to control corresponding counterweights 298C. The weights 276A, 276B and 276C weigh 0.01 ounce 0.1 ounce and 1.0 ounce respectively.

It is apparent that the described mechanism may be operated in the same manner as the other embodiments of the invention to measure the weight of an unknown object. As previously described it is possible to measure the weight of the unknown object rapidly by manipulating the knobs in descending order while watching the pointer 254, there being no need to observe the numerals on number disk 264A – 264C during such a procedure.

In summary, the invention as described to this point teaches, by way of example, how a precise magnitude of voltage, impedance or weight within a given range of magnitudes may be created by employing an increment-controlling multiple stage counter. The invention further teaches that an unknown magnitude of voltage, impedance or weight may be measured by balancing the unknown magnitude against a known magnitude created by means of a multiple stage counter. The fact that the invention may also be used to measure a force of unknown magnitude is apparent from FIG. 21 where a gravitational pull of unknown magnitude acting on the object 250 is, in effect, applied upwardly to the pan 252 and is opposed by the controlled increments of weight.

Figures 24, 26:
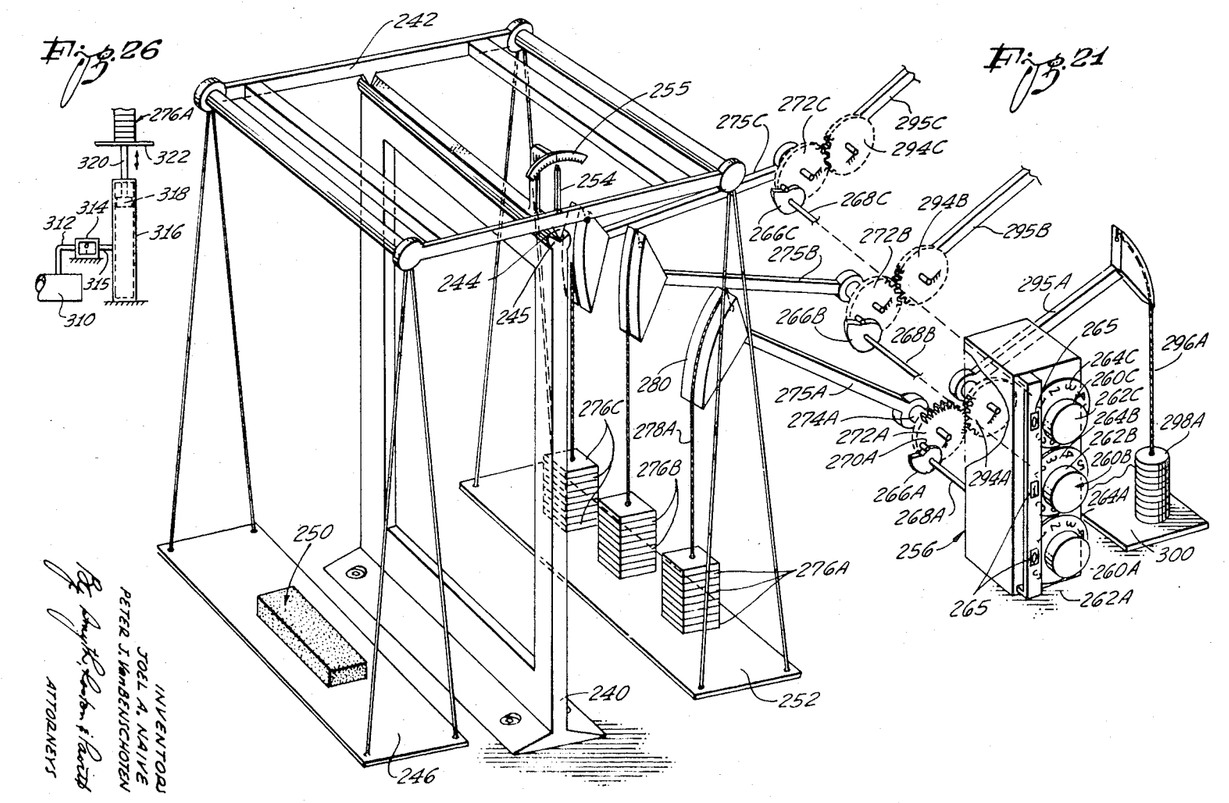
FIG. 26 is a diagrammatic view of an embodiment of the invention for measuring hydraulic pressure.

FIG. 26 shows diagrammatically, by way of example, how the same principles may be applied to measure force in the form of hydraulic pressure. In FIG. 26 the hydraulic pressure of unknown magnitude is confined in closed structure 310 which is in pressure communication through a tube 312 with one side of a pressure-responsive means in the form of a differential gage 314. The second side of the differential gage 315 is connected by a tube 315 to an upright hydraulic cylinder 316 the pressure in which is controlled by a piston 318. A piston rod 320 extends upward from the piston 318 and supports a platform 322. The previously described multiple stage counter mechanism shown in FIG. 21 may be employed to control the deposit of increments of weight 276A, 276B and 276C on the platform 322.

To obtain a precise measurement of the hydraulic pressure existing in the closed structure 310, increments of weight are added or withdrawn from the platform 322 until the differential gage 214 indicates that the opposing pressures are equal. It is apparent that the unknown pressure is applied to the differential gage 214 in one direction or respect and the pressure in the cylinder 316 created by the increments of weight is applied to the differential gage in the opposite direction or respect. In this particular instance the ratio that is employed at the comparison component 314 is 1:1 but it is obvious that the apparatus may be designed to employ any desired ratio between the two pressures. It is further obvious that the differential pressure gage may be replaced by a conventional U-tube manometer, a two-fluid differential manometer or a micromanometer.

Our description in specific detail of the selected embodiments of the invention will suggest various changes, substitutions and other departures from our disclosure within the spirit and scope of the appended claims. In the claims the term "electrical means" is to be understood as covering any combination of electrical or electronic elements either simple or complex including but not limited to inductance, mutual inductance, capacitance and resistance.

We claim:

1. In a device of the character described for varying the magnitude of an electric circuit value, the combination of:

a counter assembly comprising a plurality of rotary counters corresponding to successive orders of integers based on a given radix, each of said counters being individually adjustable;

electrical means divided into a plurality of subdivisions corresponding to the plurality of counters, each subdivision of the electrical means being variable with respect to said value over a range of values corresponding to the order of integers of the corresponding counter, each of the counters being operatively connected to the corresponding subdivision of the electrical means with the overall numerical value indicated by the counter assembly having a given relation to the total of the electrical values for which the subdivisions of the electrical means are adjusted; and transfer means between the two counters of each pair of successive counters to transfer to the higher order counter of the pair a carry generated by the lower order counter, each of said transfer means being unidirectional to permit a carry to be transferred from the lower order counter of the pair to the higher order counter while preventing the higher order counter of the pair from operating the lower order counter.

2. A combination as set forth in claim 1 which includes a null indicator to respond to said total of the electrical values and to respond to an outside electrical value that is to be measured by the device.

3. A combination as set forth in claim 2 in which said plurality of counters control a corresponding plurality of visible integers to display a total numerical value, whereby the magnitude of the electrical value to be measured may be ascertained by manually rotating the counters in turn in descending order, each counter being rotated until a null point is passed as shown by the null indicator until the lowest order counter is reached and then manually adjusting the lowest order counter to reach a null indication.

4. In a device of the character described for varying the magnitude of an electrical value incrementally with wide choice in the size of the increments to be employed in making a change and with rapid traverse between widely separated magnitudes of the value, the combination of:

a counter assembly comprising a plurality of rotary counters corresponding to successive orders of integers based on a given radix, each of said counters being individually adjustable;

electrical means divided into a plurality of subdivisions corresponding to the plurality of counters, each subdivision of the electrical means being variable with respect to said value over a range of values corresponding to the order of integers of the corresponding counter, each of the counters being operatively connected to the corresponding subdivisions of the electrical means with the overall numerical value indicated by the counter assembly having a given relation to the total of the electrical values for which the subdivisions of the electrical means are adjusted;

a Geneva type drive gear fixedly connected to each of at least all but the highest order counter for rotation therewith;

a driven gear on the higher order counter of each of the pairs of successive counters; and an idler gear between the two counters of each pair of successive counters, the idler gear operatively connecting the Geneva type gear of the lower order counter of the pair to the driven gear of the higher order counter of the pair, each idler gear together with the cooperating Geneva type gear and driven gear constituting transfer means normally operatively connecting the lower order counter of a pair of the counters to the higher order counter of the pair for actuation thereof, the teeth of each idler gear abutting the periphery of the cooperating Geneva type gear to lock the idler gear against rotation when the Geneva type gear is out of a position for transferring a carry, each of said idler gears being retractable while still locked to break the operating connection between the two counters in response to a predetermined rise in the torque applied to the driven gear whereby the higher order counter of each pair of counters may be manually operated independently of the lower order counter of the pair.

5. A combination as set forth in claim 4 in which the idler gear is axially retractable out of engagement with the corresponding driven gear;

in which spring means yieldingly opposes retraction of the idler gear; and in which the teeth of the idler gear and driven gear are shaped for cooperating cam action for retraction of the idler gear in response to rise of the applied torque force to a predetermined magnitude.

6. In a device of the character described for varying the magnitude of an electrical value incrementally with wide choice in the size of the increments to be employed in making a change and with rapid traverse between widely separated magnitudes of the value, the combination of:

a counter assembly comprising a plurality of rotary counters corresponding to successive orders of integers based on a given radix, each of said counters being individually adjustable;

electrical means divided into a plurality of subdivisions corresponding to the plurality of counters, each subdivision of the electrical means being variable with respect to said value over a range of values corresponding to the order of integers of the corresponding counter, each of the counters being operatively connected to the corresponding subdivision of the electrical means with the overall numerical value indicated by the counter assembly having a given relation to the total of the electrical values for which the subdivisions of the electrical means are adjusted; and transfer means between the two counters of each pair of successive counters to transfer to the higher of the two counters a carry generated by the lower of the two counters, said transfer means including a Geneva type drive gear fixedly mounted on the lower order counter for rotation therewith, a driven gear on the higher order counter means and an idler gear operatively connecting the drive gear to the driven gear, each of said transfer means being unidirectional to permit a carry to be transferred from any given counter of the counter assembly to a higher order counter while preventing the given counter from operating the next lower stage counter of the assembly, the plurality of counters being positioned side by side in a row with their axes parallel and with manual knobs on their forward ends, the drive gear and the driven gear being close together on each counter with their positions reversed on successive counters, the drive gear being forward of the driven gear on one counter and being rearward on the driven gear on the next adjacent counter.

7. A combination as set forth in claim 6 in which a disk with the integers of the counter thereon is mounted on each counter rearward of the manual knob of the counter.

8. In a device of the character described for varying the magnitude of an electrical value incrementally with wide choice in the size of the increments to be employed in making a change and with rapid traverse between widely separated magnitudes of the value, the combination of:

a counter assembly comprising a plurality of rotary counters corresponding to successive orders of integers based on a given radix, each of said counters being individually adjustable;

electrical means divided into a plurality of subdivisions corresponding to the plurality of counters, each subdivision of the electrical means being variable with respect to said value over a range of values corresponding to the order of integers of the corresponding counter, each of the counters being operatively connected to the corresponding subdivision of the electrical means with the overall numerical value indicated by the counter assembly having a given relation to the total of the electrical values for which the subdivisions of the electrical means are adjusted;

transfer means between the two counters of each pair of successive counters to transfer to the higher of the two counters a carry generated by the lower of the two counters, said transfer means including a Geneva type drive gear fixedly mounted on the lower order counter for rotation therewith, a driven gear on the higher order counter means and an idler gear operatively connecting the drive gear to the driven gear, said transfer means being unidirectional to permit a carry to be transferred from any given counter of the counter assembly to a higher order counter while preventing the given counter from operating the next lower stage counter of the assembly, the plurality of counters being mounted on corresponding coaxial shafts including an innermost axial shaft, the lower order counter being mounted on the innermost axial shaft and the innermost axial shaft being provided with a knob on its forward end for manual rotation of the lowest order counter; and a plurality of number disks on he respective coaxial shafts rearward of the knob with integers of the different orders thereon, said disks being of progressively different diameters to avoid masking of the integers.

9. A combination as set forth in claim 8 in which said coaxial shafts are mounted on a fixed support structure; and which includes rotary switches operated by at least some of the counters, each of said switches having a stator with a circular series of contacts and having a rotor with a wiper to cooperate with the contacts, the stator being mounted on the fixed structure between the driven gear of the corresponding counter and the drive gear of the next lower order counter.

* * * * *